(12) United States Patent
Martinez et al.

(10) Patent No.: US 7,159,686 B2
(45) Date of Patent: Jan. 9, 2007

(54) APPARATUS AND METHOD FOR DETECTION OF A LATCHING DEVICE

(75) Inventors: Daniel A. Martinez, El Paso, TX (US); Arquimedes Godoy, Chihuahua (MX); Jose L Almaraz, Chihuahua (MX); Juan C Lozano, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 285 days.

(21) Appl. No.: 10/664,127

(22) Filed: Sep. 17, 2003

(65) Prior Publication Data

US 2005/0056478 A1     Mar. 17, 2005

(51) Int. Cl.
  *B60R 21/16* (2006.01)
(52) U.S. Cl. ...................... 180/286; 280/735
(58) Field of Classification Search ............... 280/735, 280/801.1; 180/268, 286
  See application file for complete search history.

(56) References Cited

U.S. PATENT DOCUMENTS

| 5,404,102 | A |   | 4/1995 | Gokhale et al. ............ 324/252 |
| 5,468,014 | A | * | 11/1995 | Gimbel et al. ............. 280/735 |
| 5,690,356 | A |   | 11/1997 | Lane, Jr. .................... 280/735 |
| 5,851,025 | A | * | 12/1998 | Gamboa ...................... 280/735 |
| 5,898,366 | A | * | 4/1999 | Brown et al. ............ 340/457.1 |
| 5,960,523 | A | * | 10/1999 | Husby et al. ................. 24/633 |
| 6,371,516 | B1 |   | 4/2002 | Miyagawa .................. 280/735 |
| 6,419,199 | B1 | * | 7/2002 | Skofljanec et al. ...... 248/503.1 |
| 6,513,819 | B1 |   | 2/2003 | Oliver et al. |
| 6,554,318 | B1 |   | 4/2003 | Kohut et al. ............. 280/801.1 |
| 6,561,543 | B1 | * | 5/2003 | Hamada et al. ............. 280/735 |
| 6,729,194 | B1 | * | 5/2004 | Kaijala et al. ............ 73/862.69 |
| 6,755,437 | B1 | * | 6/2004 | Kraft et al. ................. 280/735 |
| 6,829,952 | B1 | * | 12/2004 | Stanley et al. ......... 73/862.391 |
| 6,831,537 | B1 | * | 12/2004 | Haas et al. .................. 335/207 |
| 6,846,012 | B1 | * | 1/2005 | Baskin et al. ............... 280/735 |
| 2004/0160044 | A1 | * | 8/2004 | Hayden et al. ............. 280/735 |

FOREIGN PATENT DOCUMENTS

EP     1053914 B1     4/2003

OTHER PUBLICATIONS

Lower Universal Anchorage System—ISOFIX, Oct. 2002, pp. 1-2.

* cited by examiner

*Primary Examiner*—Paul N. Dickson
*Assistant Examiner*—Laura B Rosenberg
(74) *Attorney, Agent, or Firm*—Paul L. Marshall

(57) ABSTRACT

A universal anchor for a vehicle, comprising: a magnet being fixedly secured to an anchor portion defining an opening; a flux deflector movably mounted to the anchor for movement in a range defined by a first position and a second position, the flux deflector effectively blocking said opening when said flux deflector is in said first position; a magnet fixedly secured to the anchor; a sensing switch configured to detect the magnetic field of the magnet, wherein the magnetic field is increased as the flux deflector moves from the first position towards the second position, the sensing switch providing a detectable signal when the magnetic field is increased.

24 Claims, 2 Drawing Sheets

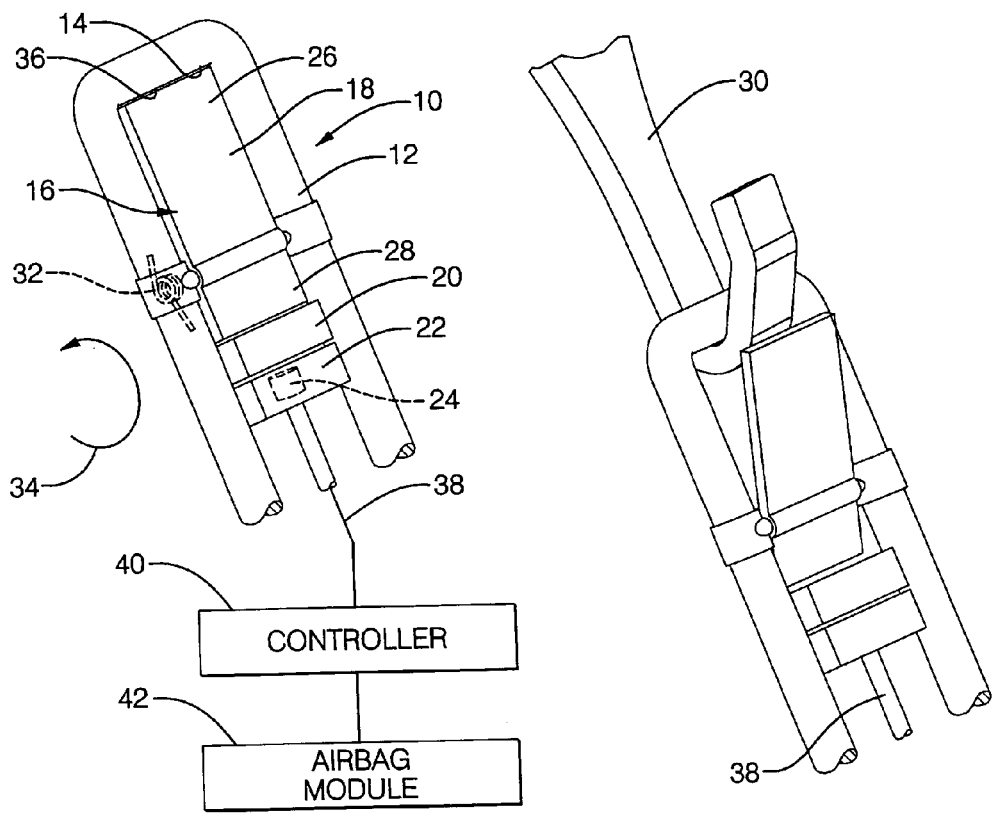
FIG. 1
FIG. 2
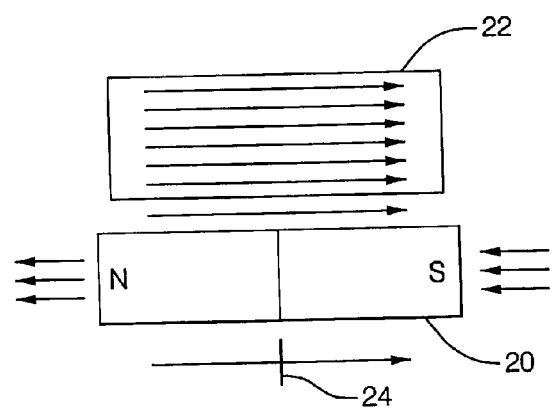
FIG. 3

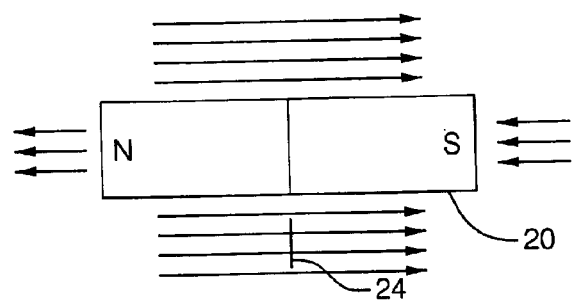
FIG. 4
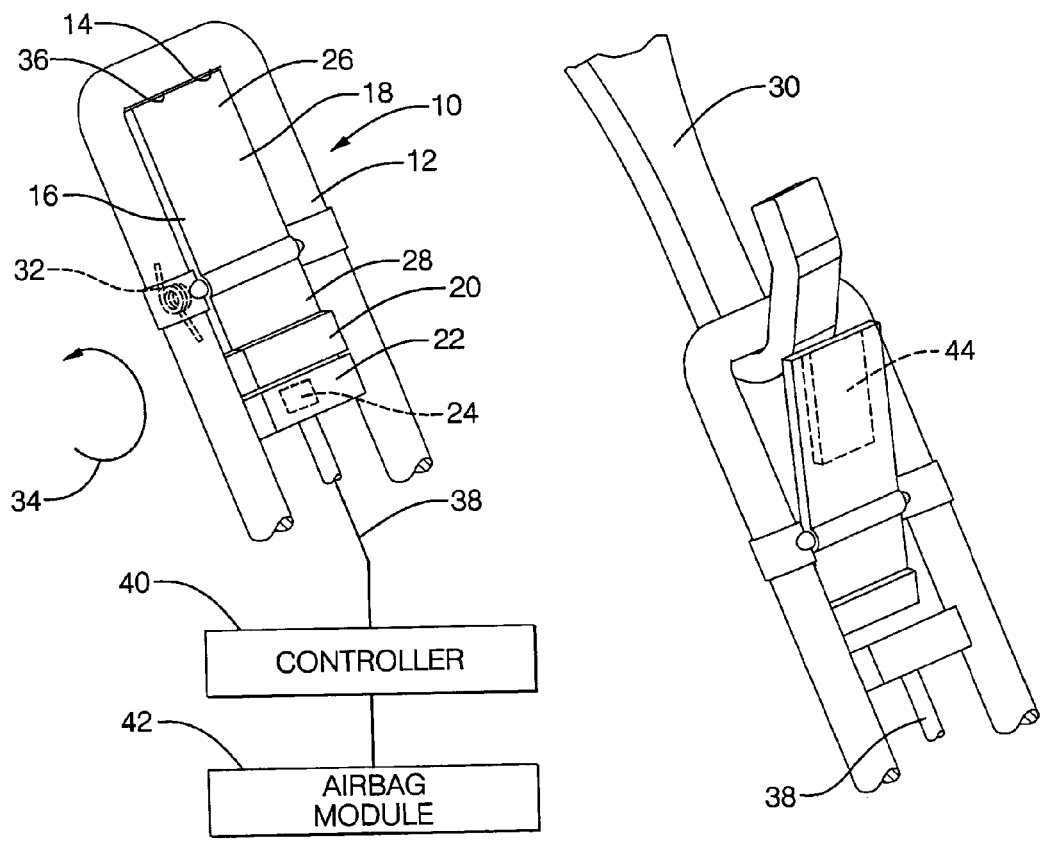
FIG. 5
FIG. 6

APPARATUS AND METHOD FOR DETECTION OF A LATCHING DEVICE

CROSS REFERENCE TO RELATED APPLICATIONS

This application is related to commonly owned and assigned U.S. patent application Ser. No. 10/664,128, entitled: "APPARATUS AND METHOD FOR DETECTION OF A LATCHING DEVICE" filed contemporaneously with this application. The contents of which are incorporated herein by reference thereto.

TECHNICAL FIELD

This application relates to sensors, and in particular, a sensing apparatus for an anchoring device in a vehicle.

BACKGROUND

Universal anchors or anchor points are provided in vehicles. These universal anchors are located throughout the vehicle to provide an anchoring point for a tethering device or latching device that is secured to a child seat at one end and has a securement mechanism for engaging the anchor at the other end.

Airbag modules or supplemental inflatable restraint systems have become common in vehicles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor or sensing device employing a control algorithm provides a signal for activating the inflator. The inflator then provides a supply of inflating gas to the cushion deploying it from the housing.

Controllers and/or the control algorithms used with inflatable restraint systems receive multiple inputs from multiple sensors wherein deployment of the inflatable restraint may partially depend on information supplied by such sensors.

SUMMARY

A method and apparatus for providing a signal to a control module indicating whether a latching device is secured to a universal anchor point.

A universal anchor for a vehicle, comprising: a magnet being fixedly secured to an anchor portion defining an opening; a flux deflector movably mounted to the anchor for movement in a range defined by a first position and a second position, the flux deflector effectively blocking said opening when said flux deflector is in said first position; a sensing switch configured to detect the magnetic field of the magnet, wherein the magnetic field is increased as the flux deflector moves from the first position towards the second position, the sensing switch providing a detectable signal when the magnetic field is increased.

A detection device for a universal anchor of a vehicle, comprising: a movable member being movably mounted within an opening defined by the anchor, the movable member being capable of movement within a range defined by a first position and a second position, wherein the opening is effectively blocked by the movable member when the movable member is in the first position, the movable member further comprising an actuating end and a detection end; a magnet disposed on the detection end of the movable member; a sensing device for detecting the magnetic field of the magnet, wherein the sensing device provides a signal indicative of the position of the movable member.

The above-described and other features and advantages of the present invention will be appreciated and understood by those skilled in the art from the following detailed description, drawings, and appended claims.

BRIEF DESCRIPTION OF THE DRAWINGS

FIG. 1 is a perspective view of a universal anchor with a detecting device of an exemplary embodiment of the present invention secured thereto;

FIG. 2 is a perspective view of a universal anchor with a detecting device of an exemplary embodiment of the present invention secured thereto and a hook of a child seat secured to the universal anchor;

FIG. 3 illustrates the flux lines of a magnet when the detecting device is in the position illustrated by FIG. 1;

FIG. 4 illustrates the flux lines of a magnet when the detecting device is in the position illustrated by FIG. 2;

FIG. 5 is a perspective view of an alternative embodiment of the present invention; and FIG. 6 is a perspective view of a universal anchor with a detecting device of another alternative embodiment of the present invention.

DETAILED DESCRIPTION OF EXEMPLARY EMBODIMENTS

Disclosed herein is an apparatus, which is secured to a portion of a universal anchor. The apparatus comprises a movable member which must be moved in order to allow a latching device or member to be secured to the anchor. The movement of the movable member deflects the magnetic flux in the vicinity of the Hall effect or magneto-resistor MR device secured to the anchor. The change in magnetic flux is detected by a sensing switch or assembly disposed proximate to the magnet. The sensing assembly provides a signal indicative of movement of the movable member to a controller. Thus, a sensing system is provided to indicate whether a latching device has been secured to the anchor. In an exemplary embodiment, the sensing system provides an indication to a system controller of the vehicle in which the anchor is installed.

The sensing system includes a magnetic sensing device (e.g., Hall-effect, MR), a magnet, and a rotating flux deflector (ferrous material). The magnet produces a magnetic field (North to South) that is detected by the magnetic sensing device. In the unlatched state, the proximity of the flux concentrator produces an unbalanced flux of magnetic lines through the top and bottom of the magnet. The number of magnetic lines going out of the top side, where the flux deflector is located, is significantly higher than the number of lines on the bottom side when the flux deflector is in the position illustrated in FIG. 1.

When the child restraint hook is engaged into the housing anchor the flux deflector is displaced increasing the gap between the magnet and flux deflector. The produced gap is large enough to prevent the flux deflector from affecting significantly the field surrounding the magnet. Thus, a "balanced" state of magnetic flux lines is achieved when the flux deflector is in this position. In this position, the magnetic field lines will go through the top and bottom sides of the magnet. The sensing device detects this change in magnetic flux. The flux change detected by the magnetic sensing device on each state can be transformed to a voltage or current signal and transmitted to the vehicle airbag system to determine whether the airbag should be activated or not.

The sensing system is installed in a housing secured to an anchor positioned for engaging a hook. The housing is locked onto the anchor such as a passenger seat lower anchor or directly to the bar where the lower anchors are fixed.

Referring now to FIG. 1, an anchoring device 10 with the detecting device of an exemplary embodiment is illustrated. Of course, many other configurations of anchoring device 10 are contemplated in accordance with exemplary embodiments of the present invention.

As illustrated in FIG. 1, anchoring device 10 comprises an anchor 12 configured to provide an opening 14 that is used to allow an engagement device to engage a portion of anchor 12. In an exemplary embodiment, anchor 12 is manufactured out of a durable material such as steel.

A detection device 16 is secured to anchor 12. Detection device 16 comprises a flux deflector 18 pivotally mounted to anchor 12. In an exemplary embodiment, flux deflector 18 comprises a planar shape and effectively covers or fills opening 14 when flux deflector 18 is in a first position illustrated in FIG. 1. An example of a flux deflector contemplated for use with exemplary embodiments of the present invention is found in U.S. patent application Ser. No. 10/437,755, entitled "MAGNETOSENSITIVE LATCH ENGAGEMENT DETECTOR FOR A MECHANICAL FASTENING SYSTEM", filed on May 14, 2003. The contents of which are incorporated herein by reference thereto. Of course, other types of flux deflectors are contemplated for use in the various embodiments of the present invention. The flux deflector 18 is constructed out of a ferrous material which, when brought in close proximity to a magnet 20, reduces the magnetic flux generated by magnet 20 secured to anchor 12. In particular, the magnetic flux generated by magnet 20 is diverted by the flux deflector when it is in the position illustrated in FIG. 1. The position illustrated in FIG. 1 corresponds to no latching mechanism being secured to anchor 12.

For example, and referring now to FIG. 3, the magnetic field lines of magnet 20 are illustrated by the arrows wherein the detectable magnetic flux generated by magnet 20 is affected by flux deflector 18 being in close proximity to magnet 20. Referring back now to FIG. 1, a sensing switch or sensing assembly 22 is secured to anchor 12 in close proximity to magnet 20. The sensing switch is configured to detect the change of the magnetic flux generated by magnet 20.

In an exemplary embodiment, sensing assembly or switch 22 is configured and positioned to detect changes in the magnetic flux of magnet 20, which are affected by the movement of flux deflector 18. Accordingly, sensing assembly or switch 22 is configured to provide a signal indicative of movement of flux deflector, which corresponds to the change in the magnetic flux of magnet 20, which relates to the securement of a latching mechanism to anchor 12.

In an exemplary embodiment, sensing assembly or switch 22 comprises a magnetosensitive device such as Hall effect device 24 and complimentary circuit, which in an exemplary embodiment is encased in a plastic housing or other equivalent means for over-molding and encasing the circuit. Magnetosensitive devices, such as Hall effect devices, magnetoresistors and anisotropic magnetoresistors provide electrical responses related to the proximity and direction of a magnetic field, respectively. An example of one such device is found in U.S. Pat. No. 5,404,102.

Hall effect sensors are known to individuals skilled in the related arts and provide a voltage or current output ratio as the poles of a magnet or magnets are moved with respect to the sensor. Of course, other sensing devices including optical or equivalents thereof for sensing movement of an object are contemplated to be used in lieu of a Hall effect sensor.

In accordance with exemplary embodiments of the present invention, the magnetoresistor (MR) of sensing assembly or switch 22 is biased with a magnetic field and electrically excited, by a current or voltage source. A magnetic (i.e., ferromagnetic) object moving relative, to the MR, produces a varying magnetic flux density through the MR, which, in turn, varies the resistance of the MR. In accordance with an exemplary embodiment, an electronic circuit drives the magnetosensitive device, wherein a first level of output is registered from the magnetosensitive device responsive to the flux deflector being in close proximity to the magnetosensitive device. Since the signal output of the magnetosensitive device is responsive to the magnetic flux passing therethrough, the electronic circuit registers a second output signal from the magnetosensitive device when the flux deflector is moved away from the magnetosensitive device.

In accordance with exemplary embodiments, a magnetosensitive device, for example a Hall effect device or a magnetoresistor, is located to detect the magnetic field of a magnet wherein a magnetic field having a first flux density is established at the device corresponding to a first position of the flux deflector, which causes the magnetosensitive device to have a first electrical response, via an appropriate electronic circuit for driving the magnetosensitive device.

An electronic circuit provides excitation of the MR and provides an output signal. A controlled excitation current source delivers a current which flows through the MR to develop a voltage drop across the MR with respect to ground potential.

Sensing assembly 22 is fixedly secured to the anchor such that movement of flux deflector in a range defined by a first position (FIG. 1) and a second position (FIG. 2), causes magnet 20 to produce a magnetic field which is detected by the Hall effect device, which remains stationary.

Flux deflector 18 also comprises a contact end 26 and flux deflection end 28. In an exemplary embodiment contact end 26 makes contact with a latching device 30 as it is being secured to anchor 12 and flux deflection end 28 is in close proximity to magnet 20. Contact end 26 is configured to be in close proximity with a portion of anchor 12 such that opening 14 is substantially closed or blocked by flux deflector 18 when flux deflector 18 is in a first position corresponding to anchor device not have a latching mechanism secured thereto. For example, the position illustrated in FIG. 1. In order to maintain flux deflector 18 at the position illustrated in FIG. 1, a biasing member or spring 32 is configured and positioned to bias or maintain flux deflector 18 in the position illustrated in FIG. 1 by providing a biasing force in the direction of arrow 34.

In an alternative embodiment and in order to maintain the flux deflector 18 in the position illustrated in FIG. 1, a stopping member 36 protrudes from anchor 12. As an alternative, anchor 12 and opening 14 are configured such that the flux deflector 18 will not pass completely through opening 14 as it is biased in the direction of arrow 34. Accordingly, and as flux deflector 18 moves in the range defined by the first position (e.g., FIG. 1) and the second position (e.g., FIG. 3), the magnetic field of magnet 20 increases and is detected by the Hall effect device, wherein the detected magnetic field is converted to an electrical signal either in the form of voltage or current. The signal is then outputted on a cable 38 for receipt by a controller 40, which controls the deployment of an airbag module 42.

As illustrated in FIGS. 1–4, the Hall effect device will sense the strength of the magnetic field of the magnet, and depending on the strength of the magnetic field, the Hall effect device will generate an electric signal to determine the position of flux deflector 18.

Alternatively, and referring now to FIGS. 5 and 6, the device can be configured such that the flux deflector 18 and the magnet 20 can be integrated into one component by attaching the magnet at the flux deflection end 28 of the flux deflector. The sensing device 24 is then configured to provide an output signal when the magnet moves away from the sensing device (e.g., FIG. 6). In either embodiment, the signal is received by an algorithm of the system controller in a vehicle having the anchoring device 16 installed therein.

In yet another alternative embodiment, either the movable member or the flux deflector is configured to have a channel 44 proximate to the actuating end. The channel providing a means for guiding the latching device as it is secured to the anchor.

An exemplary use for the signal generated by the detection device is to provide an airbag suppression signal to an airbag module controller or supplemental restraint controller in order to determine whether or not to suppress any related devices such as hyper-tensioners, airbag modules, or seat belt pre-tensioners, etc. An example of such a device is a microcontroller of a sensing and diagnostic module for use with an airbag module, which will suppress the air bag and in one embodiment provide a signal to an indicator light to indicate that the air bag has been suppressed. In an exemplary embodiment the indicator light is located in a position within the vehicle compartment that is easily viewed by the operator and/or occupants of the same. For example, one such location of the indicator light is on the vehicle dashboard. In addition, the microcontroller may also provide an audible tone or voice response, indicating that the air bag has been suppressed.

The signal generated by the sensing assembly is propagated through a cable 38 secured to the circuit or other means of data transmission RF, optical ect. to the controller. In addition, other connections for the Hall effect device and related circuit are provided by cable 38.

It is also contemplated that the latching device will be fixedly secured to a child seat at one end while engaging the anchor device at the other end.

Accordingly, and through usage of any of the embodiments disclosed herein, the detection device provides a means for providing an output signal indicative of whether a latching device of any type of hook or connection means is engaged or latched upon the anchor. In accordance with an exemplary embodiment the latching device is secured to a child seat at one end and the anchor at the other end wherein movement of the movable member causes a signal to be generated and the signal is employed in a control algorithm.

In an alternative embodiment, it is contemplated that the detection device may be configured to be used with a seat belt anchor to provide a signal indicative of a seat belt latch being secured thereto.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A universal anchor for a vehicle, comprising:
   a magnet being fixedly secured to an anchor portion defining an opening;
   a flux deflector of ferro-magnetic material movably mounted to said anchor for movement in a range defined by a first position wherein said flux deflector is adjacent said magnet on an opposite side of said magnet from a sensing switch and said flux deflector is biased into said first position, and a second position wherein said flux deflector is moved away from said first position, said flux deflector effectively blocking said opening when said flux deflector is in said first position;
   said sensing switch mounted adjacent to said magnet configured to detect the magnetic field of said magnet, wherein said magnetic field is increased as said flux deflector moves from said first position towards said second position, said sensing switch providing a detectable signal when said magnetic field is increased.

2. The universal anchor as in claim 1, wherein said sensing switch comprises a Hall effect device positioned to sense the magnetic field of said magnet.

3. The universal anchor as in claim 1, wherein said detectable signal being received by a controller of an airbag module and said controller suppresses the operation on an airbag module in response to said detectable signal received from said sensing switch.

4. The universal anchor as in claim 1, wherein flux deflector is biased into said first position, wherein said flux deflector must be moved from said first position to allow a hook to engage said anchor.

5. The universal anchor as in claim 4, wherein said sensing switch comprises a Hall effect device positioned to sense the magnetic field of said magnet.

6. The universal anchor as in claim 5, wherein said detectable signal being received by a controller of an airbag module.

7. The universal anchor as in claim 1, wherein said flux deflector effectively blocks said opening when said flux deflector is in said first position and movement of said flux deflector from said first position is detected by said sensing switch.

8. The universal anchor as in claim 7, wherein said flux deflector further comprises an actuating end and a flux deflection end, wherein said actuating end travels in a first direction and said flux deflection end travels in a second direction when said flux deflector moves from said first position, said first direction being opposite to said second direction.

9. The universal anchor as in claim 8, wherein said actuating end further comprises a channel portion.

10. The universal anchor as in claim 8, wherein said actuating end and said flux deflection end are each configured to have a periphery larger than a corresponding portion of said opening being blocked by said flux deflector.

11. The universal anchor as in claim 7, wherein said flux deflector further comprises an actuating end and a flux deflection end, wherein said actuating end travels in a first direction and said flux deflection end travels in a second direction when said flux deflector moves from said first position, said flux deflector being biased into said first position.

12. The universal anchor as in claim 11, further comprising a stopping member for making contact with said actuating end when said flux deflector is in said first position.

13. The universal anchor as in claim 12, wherein said actuating end further comprises a channel portion.

14. The universal anchor as in claim 11, wherein said actuating end and said flux deflection end are each configured to have a periphery larger than a corresponding portion of said opening being blocked by said flux deflector.

15. A detection device for a universal anchor of a vehicle, comprising:
    a pivotable member being pivotably mounted within an opening defined by the anchor, said pivotable member being capable of movement within a range defined by a first position and a second position, wherein the opening is effectively blocked by said pivotable member when said pivotable member is in said first position, said pivotable member further comprising an actuating end and a detection end;
    a magnet disposed on said detection end of said pivotable member;
    a sensing device for detecting the magnetic field of said magnet, wherein said sensing device provides a signal indicative of the position of said pivotable member.

16. The detection device as in claim 15, wherein said sensing device comprises a Hall effect device positioned to sense the magnetic field of said magnet.

17. The detection device as in claim 15, wherein said pivotable member is biased into said first position.

18. The detection device as in claim 15, wherein said signal is received by a controller of an airbag module.

19. The detection device as in claim 15, wherein said pivotable member is biased into said first position, and said pivotable member must be moved from said first position to allow a hook to engage said anchor.

20. The detection device as in claim 19, further comprising a stopping member for making contact with said actuating end when said pivotable member is in said first position.

21. The detection device as in claim 15, wherein said actuating end travels in a first direction and said detection end travels in a second direction when said pivotable member moves from said first position, said first direction being opposite to said second direction.

22. The detection device as in claim 21, wherein said actuating end further comprises a channel portion.

23. The detection device as in claim 21, further comprising a stopping member for making contact with said actuating end when said pivotable member is in said first position.

24. The detection device as in claim 15, wherein said actuating end and said detection end are each configured to have a periphery larger than a corresponding portion of said opening being blocked by said pivotable member.

* * * * *